United States Patent Office 3,655,692
Patented Apr. 11, 1972

3,655,692
3-AMINO-TETRAHYDROTHIOPHENE-3-CARBOXYLIC ACIDS
Tsung-Ying Shen and Gordon L. Walford, Westfield, N.J., assignors to Merck & Co., Inc., Rahway, N.J.
No Drawing. Original application Sept. 11, 1967, Ser. No. 666,922, now Patent No. 3,547,948, dated Dec. 15, 1970. Divided and this application Apr. 7, 1970, Ser. No. 23,103
Int. Cl. C07d 63/04
U.S. Cl. 260—332.2 C   2 Claims

ABSTRACT OF THE DISCLOSURE

Processes for the preparation of novel amino acids. The compounds are 5-membered heterocyclic amino acid derivatives of teramethylene sulfide and trimethylene-1,2-disulfide. The sulfide derivatives are prepared by converting a keto tetramethylene sulfide to its corresponding amino nitrile, with subsequent hydrolysis to the amino acid. The 1,2-disulfide derivatives are prepared via reaction of an alkyl ketone with an aralkyl mercaptan with ultimate elimination of the sulfur protecting group and oxidation to the disulfide. The novel amino acids are useful as anti-inflammatory agents.

This is a division of copending application Ser. No. 666,922, filed Sept. 11, 1967, now U.S. Pat. 3,547,948, issued Dec. 15, 1970.

BACKGROUND OF THE INVENTION

Field of the invention

The invention relates to processes for the preparation of novel amino acids. The amino acids are 5-membered heterocyclic compounds containing 1–2 sulfur atoms. The compounds are amino acid derivatives of tetramethylene sulfides and trimethylene-1,2-disulfides.

Description of the prior art

Interest in anti-metabolites has increased greatly in recent years, and many analogues of amino acids, vitamins, purines, and other metabolites have been prepared. Chemicals and antibiotics capable of interfering with the synthesis of protein by living cells have recently been studied as anti-inflammatory agents. By the present invention, novel synthetic amino acids are provided which are useful as anti-inflammatory agents and as anti-metabolites.

SUMMARY OF THE INVENTION

Novel α-amino-carboxylic acid derivatives of tetramethylene sulfide and trimethylene-1,2-disulfide and methods of preparing them are provided. Novel intermediates useful in the preparation of these novel amino acids are also provided. The novel amino acids are useful as anti-inflammatory agents and as anti-metabolites.

DESCRIPTION OF THE PREFERRED EMBODIMENTS

Inflammation is the reaction of irritated and damaged tissues which still retain vitality; it is a process which begins following a sub-lethal injury to tissue and ends with complete healing. It is characterized by redness, heat, swelling, and pain.

Certain aspects of inflammation, particularly the vascular phenomena, are related to chemical mediators derived from damaged tissue and are subject, therefore, to precise measurement and modification. A search for agents capable of inhibting the inflammatory reaction has long been under way. Both antipyretic and analgesic compounds have long been employed clinically for this purpose.

The amino acids have been the subject of considerable study by biochemists in recent years. The literature of this field is voluminous and provides ample evidence of the striking advances which have been made since the isolation of the first amino acid. Many naturally occuring amino acids are known, and their function in metabolism has been extensively studied.

By the present invention, novel amino acids are provided which possess a marked degree of anti-inflammatory activity and, in particular, are effective in inhibiting the swelling which generally accompanies edematous inflammation.

The compounds which are the subject of this invention can be depicted as follows:

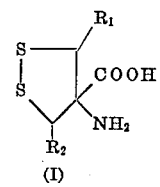 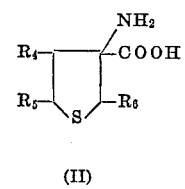

(I)   (II)

where $R_1$, $R_2$, $R_4$, $R_5$, and $R_6$ are selected from the group consisting of hydrogen, loweralkyl, such as methyl, ethyl, butyl and propyl, and phenyl.

The compounds of Formula I may be conveniently classified as 4-amino-4-carboxylic acid trimethylene-1,2-disulfides. They may alternately be described as 4-amino-1,2-dithiolane-4-carboxylic acids.

The compounds of Formula II may be described as 3-amino-3-carboxylic tetramethylene sulfides or, alternatively, 3-amino-tetrahydrothiophene-3-carboxylic acids.

The compounds of Formula I can be prepared by the process depicted in the following diagram:

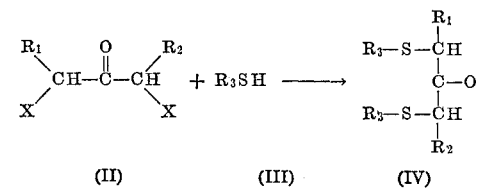

(II)   (III)   (IV)

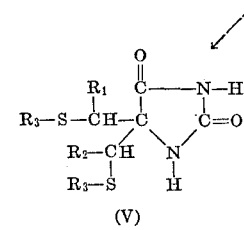

(V)

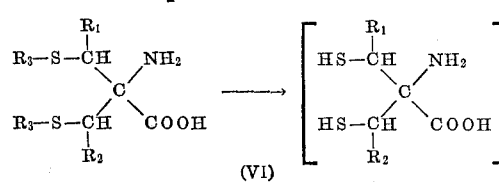

(VI)

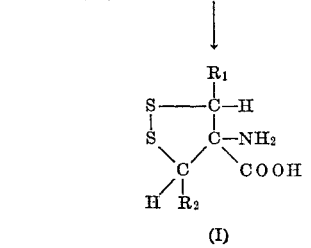

(I)

where $R_1$ and $R_2$ are as previously defined, $R_3$ equals benzyl, diphenylmethyl or triphenylmethyl, and X equals halogen.

The first step in the synthesis of a 4-amino-4-carboxylic acid trimethylene-1,2-disulfide involves the preparation of a bis-aralkylthio ketone. This compound is prepared by reacting about 1 molar equivalent of a dihalo ketone, such as 1,3-dichloro-2-propanone or 1,3-dibromo-2-propanone, with about 2 molar equivalents of an alkali metal aralkyl mercaptide, such as sodium benzyl mercaptide, in a suitable solvent, such as methanol or ethanol. Since the sulfur protecting group is removed at the end of the synthetis, mercaptans which possess a labile group are most useful in this step. Mercaptans such as benzyl mercaptan, diphenylmethyl mercaptan and triphenylmethyl mercaptan can be employed. The reaction is generally carried out by dissolving, for example, sodium metal in a solution of an aralkyl mercaptan in a solvent such as absolute ethanol. The reaction mixture is stirred vigorously during the addition of sodium, and the reaction is generally moderated by external cooling; the dihalo ketone is dissolved in the same solvent and is added slowly, preferably dropwise, to the reaction mixture. After addition of the ketone is complete, the reaction is generally stirred an additional 12–15 hours to ensure complete reaction. The solvent is then removed and the residue is dissolved in a suitable solvent such as ether, benzene or ethyl acetate. The solution is dried over a suitable drying agent, such as magnesium sulfate, the solvent is removed in vacuo, and the residue is purified by recrystallization or by other techniques known in the art.

The second step involves the preparation of a bis-($\alpha$-aralkylthioalkyl)-hydantoin. The bis-aralkylthio ketone is dissolved in a suitable solvent, such as ethanol or propanol, and is warmed to about 40°–90° C. An aqueous solution of a metal cyanide, such as potassium cyanide or sodium cyanide, is added, followed by ammonium carbonate. The reaction mixture is then stirred at about 30°–90° C. for 18–24 hours. Upon cooling, the product generally settles out of solution, is collected by filtration, and is purified by recrystallization from a suitable solvent, or by other techniques known in the art.

The third step involves the preparation of a bis-(aralkylthioalkyl)-glycine compound, which compound is prepared by treating a bis-aralkylthioalkyl hydantoin compound with a base such as barium hydroxide in a suitable solvent, such as water. The reaction is generally heated at reflux for about 5–7 days to ensure complete hydrolysis. The cooled reaction mixture is then made strongly acidic by addition of a mineral acid such as hydrochloric acid. The glycine derivative is generally insoluble in the acidic medium, and is collected by filtration. Where the product is soluble in the solvent employed, the free amino acid can be obtained by treating the solution with an acid such as sulfuric acid; any barium present will be precipitated as barium sulfate, which can be removed by filtration. The filtrate is treated with acid until the solution is just at the isoelectric point. The solid generally settles out of solution, and is collected by filtration. Alternatively, the solution can be concentrated to the point where the solid begins to settle out of solution, after which the free amino acid is collected by filtration and is purified by recrystallization or by other techniques known in the art.

The fourth step in the synthesis of a novel amino acid of Formula I involves the elimination of the aralkyl blocking group from a bis-(aralkylthioalkyl)-glycine compound to form a dimercaptan which is not generally isolated but is conveniently oxidized to form the disulfide bond present in the final product. The various blocking groups can be removed with a variety of reagents such as hydrogen bromide in acetic acid, trifluoroacetic acid or sodium in liquid ammonia; where groups such as benzyl are used as the blocking group, more vigorous conditions such as sodium in liquid ammonia are necessary for their removal. The glycine derivative is treated with sodium metal in liquid ammonia, the sodium being added in small portions. An amount of ammonium chloride equivalent to the amount of sodium used is added, and the ammonia is allowed to evaporate. The residue is taken up in water, and the pH of the solution is adjusted to about 6–7 by the addition of a mineral acid, such as dilute hydrochloric acid. The solution is extracted with a solvent, such as ether or chloroform, and the aqueous phase is then added dropwise to a stirred solution of an oxidizing agent such as, for example, aqueous iodine. The resulting solution is extracted with a suitable solvent, such as ether or chloroform, and the aqueous phase is neutralized by the addition of a base such as concentrated ammonium hydroxide. The aqueous solution is then concentrated to the point where the solid settles out of solution. The solid is collected by filtration and is recrystallized from a suitable solvent, such as methanol-water, or is purified by other techniques known in the art.

The compounds of Formula II can be prepared by the process depicted in the following diagram:

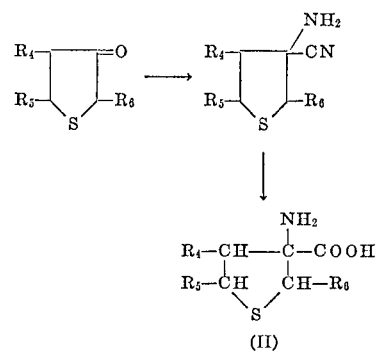

(II)

where $R_4$, $R_5$ and $R_6$ are selected from the group consisting of hydrogen, loweralkyl, and phenyl.

The first step involves the conversion of a 3-ketotetrahydrothiophene compound to its corresponding aminonitrile derivative. The starting 3 - ketotetrahydrothiophene compounds can be prepared by the method of Woodward and Eastman [R. B. Woodward and R. H. Eastman, J.A.C.S. 68, 2229 (1946)]. The conversion to the aminonitrile is effected by adding a 3-ketotetrahydrothiophene compound to a mixture of ammonium chloride, a metal cyanide, such as sodium cyanide, concentrated aqueous ammonia, and an alcohol such an ethanol or propanol, saturated with gaseous ammonia. The entire mixture is stirred generally for from 15–20 hours, after which it is extracted with a solvent, such as ether or methylene chloride. The residue left after removal of the organic solvent is generally used in the second step without further purification, but it can be further purified by recrystallization or by other techniques known in the art.

The tetrahydrothiophene amino-nitrile compound is hydrolyzed to a 3 - aminotetrahydrothiophene-3-carboxylic acid compound by treating the cyano compound with a mineral acid, such as hydrochloric acid, generally at reflux temperatures for about 1–5 hours. The mixture is evaporated to dryness, the residue is taken up in water, and the solution is made neutral by the addition of a base, such as ammonium hydroxide. The product generally settles out of the neutral aqueous solution, is collected by filtration and purified by recrystallization or by other techniques known in the art.

Also included within the scope of this invention are certain derivatives which can be derived from the novel amino acids, such as metal salts, for example, sodium and potassium, amine salts, such as ammonium and triethylamine, mineral acid salts such as the hydrochlorides and hydrobromides, esters, and amides.

The anti-inflammatory activity of the novel amino acids has been demonstrated in vivo. For example, the following tabulated results indicate the effectiveness of 4-amino-1,2 - dithiolane-4-carboxylic acid in inhibiting edema in rats:

TABLE I

| Dose, mg./kg.: | Percent inhibition |
|---|---|
| 30 | 22 |
| 90 | 46 |
| 100 | 70 |

In a similar manner, 3-aminotetrahydrothiophene-3-carboxylic acid exhibits 22% inhibition at a dosage of 100 mg./kg.

In addition to their anti-inflammatory activity, the novel amino acids have been found to be effective in inhibiting the growth of HeLa cells and/or the incorporation of certain amino acids and nucleic acid precursors. For example, both 3 - aminotetrahydrothiophene-3-carboxylic acid and 4 - amino-1,2-dithiolane-4-carboxylic acid will completely inhibit the growth of HeLa cells at 0.5 mM., and 4-amino-1,2-dithiolane-4-carboxylic acid will inhibit the incorporation of hypoxanthine and leucine.

The following examples are given for the purpose of illustration and not by way of limitation:

EXAMPLE 1

1,3-bis-benzylthio-2-propanone

Sodium metal (23.0 grams, 1.0 g.-atom) is added in small pieces to a well-stirred solution of benzyl mercaptan (118 ml., 1.0 mole) in 400 ml. of absolute ethanol; the reaction mixture is cooled in an ice bath during the addition of the sodium. A solution of 1,3-dichloro-2-propanone (63.5 grams, 0.50 mole) in 100 ml. of absolute ethanol is added dropwise during 2 hours with continued stirring and cooling. After the addition is complete, the reaction mixture is stirred 15 hours at room temperature. The solvent is evaporated in vacuo, the residue is taken up into 400 ml. of ether, and the ether solution is filtered free of the inorganic solids. The filtrate is washed with 2× 100 ml. of water, dried over anhydrous magnesium sulfate, and evaporated in vacuo to yield 138 grams of 1,3-bis-benzylthio-2-propanone as a dark viscous oil.

When in the above procedure 1,3-dichloro-2-butanone, 1,3 - dibromo - 2 - pentanone, 1,3 - dibromo-1,3-diphenyl-2 - butanone, and 2,4 - dibromo - 3 - hexanone are employed in place of 1,3 - dichloro - 2 - propanone, there are obtained 1,3 - bis-benzylthio - 2-butanone, 1,3-bis-benzylthio - 2 - pentanone, 1,3-bis-benzylthio-1,3-diphenyl-2-butanone, and 2,4-bis-benzylthio-3-hexanone, respectively.

EXAMPLE 2

5,5-bis-benzylthiomethyl hydantoin 1,3-bis-benzylthio-2-propanone (30.2 grams, 0.1 mole) in 300 ml. of ethanol is warmed to 60°–70° C. with stirring in an oil bath. A solution of potassium cyanide (10 grams) in 100 ml. of water is added, followed by solid ammonium carbonate (60 grams), and the stirring is continued at 60°–70° C. for 24 hours. Upon cooling, a brown solid separates which is collected by filtration, washed with ethanol and water, and is purified, with the aid of decolorizing carbon, by crystallization from ethanol to yield 20.4 grams of 5,5-bis-benzylthiomethyl hydantoin, M.P. 182°–187° C.

When in the above procedure 1,3-bis-benzylthio-2-butanone, 1,3 - bis-benzylthio - 2-pentanone, 1,3-bis-benzylthio - 1-phenyl-2-butanone, and 2,4-bis-benzylthio-3-hexanone are employed in place of 1,3 - bis-benzylthio-2-propanone, there are obtained 5-benzylthiomethyl-5-($\alpha$-benzylthio)-ethyl hydantoin, 5-benzylthiomethyl-5-($\alpha$-benzylthio)-propyl hydantoin, 5-($\alpha$-benzylthio)-benzyl-5-($\alpha$-benzylthio)-ethyl hydantoin, and 5 - ($\alpha$-benzylthio)-ethyl-5-($\alpha$-benzylthio)-propyl hydantoin, respectively.

EXAMPLE 3

Bis-(benzylthiomethyl)-glycine

A mixture of 5,5-bis-benzylthiomethyl hydantoin (18.6 grams, 0.05 mole) dried barium hydroxide (57 grams), and 465 ml. of water is heated at reflux for 140 hours. The reaction mixture is cooled and made strongly acidic with concentrated hydrochloric acid to dissolve suspended barium salts. The undissolved solid is filtered off and washed with water. Recrystallization from 95% ethanol yields 9.4 grams of pure 2,2-bis-(benzylthiomethyl)-glycine, M.P. 205°–206° C. dec.

When in the above procedure 5-benzylthiomethyl-5-($\alpha$-benzylthio) - ethyl hydantoin, 5 - benzylthiomethyl-5-($\alpha$-benzylthio)-propyl hydantoin, 5-($\alpha$-benzylthio)-benzyl-5-($\alpha$-benzylthio)-ethyl hydantoin, and 5-($\alpha$-benzylthio)-ethyl-5-($\alpha$-benzylthio)-propyl hydantoin are employed in place of 5,5-benzylthiomethyl hydantoin, there are obtained 2-benzylthiomethyl-2-($\alpha$-benzylthio)-ethyl glycine, 2-benzylthiomethyl-2-($\alpha$-benzylthio)-propyl glycine, 2-($\alpha$-benzylthio)-benzyl - 2 - ($\alpha$-benzylthio)-ethyl glycine, and 2-($\alpha$-benzylthio)-ethyl - 2 - ($\alpha$-benzylthio)-propyl glycine, respectively.

EXAMPLE 4

4-amino-1,2-dithiolane-4-carboxylic acid

A solution of 2,2-bis-(benzylthiomethyl)-glycine (6.6 grams, 0.02 mole) in 150 ml. of liquid anhydrous ammonia is treated with sodium metal in small portions with vigorous stirring until the mixture assumes a permanent blue coloration. The color is just discharged by the addition of ammonium chloride, and additional ammonium chloride, equivalent to the quantity of sodium used, is added. The ammonia is allowed to evaporate at room temperature under a slow stream of nitrogen. The residue is taken up in 100 ml. of water, and the pH of the solution is adjusted to 6 by the addition of dilute hydrochloric acid. The solution is extracted with 50 ml. of ether, and the aqueous phase is then added slowly to 20 ml. of a stirred 2 N aqueous solution of iodine. The excess iodine is destroyed with aqueous 10% sodium bisulfite. The solution is extracted with 50 ml. of ether, and the aqueous phase is neutralized with concentrated ammonium hydroxide. The neutral solution is filtered free of undissolved material. The solution is concentrated in vacuo to a volume of 50–60 ml., and the solid which separates out of solution is filtered off. Recrystallization from aqueous methanol yields pure 4-amino-1,2-dithiolane-4-carboxylic acid.

When in the above procedure 2-benzylthiomethyl-2-($\alpha$-benzylthio)-ethyl glycine, 2-benzylthiomethyl - 2 - ($\alpha$-benzylthio)-propyl glycine, 2-($\alpha$-benzylthio)-benzyl-2-($\alpha$-benzylthio)-ethyl glycine, and 2-($\alpha$-benzylthio)-ethyl-2-($\alpha$-benzylthio)-propyl glycine are employed in place of 2,2-bis-(benzylthiomethyl)-glycine, there are obtained 4-amino-3-methyl-1,2-dithiolane-4-carboxylic acid, 4-amino-3-methyl-1,2-dithiolane-4-carboxylic acid, 4-amino-3-ethyl-1,2-dithiolane-4-carboxylic acid, 4-amino-3-methyl-5-phenyl-1,2-dithiolane-4-carboxylic acid, and 4-amino-3-ethyl-5-methyl-1,2-dithiolane-4-carboxylic acid, respectively.

EXAMPLE 5

3-amino-3-cyanotetrahydrothiophene 3-ketotetrahydrothiophene (10.2 grams, 0.10 mole) is added during 30 minutes to a well-stirred mixture of ammonium chloride (11.5 grams), sodium cyanide (10.4 grams), concentrated aqueous ammonia (70 ml.) and ethanol saturated with gaseous ammonia (40 ml.). The stirring is continued for 16 hours at room temperature. The reaction mixture is extracted with 3× 50 ml. of ether, and the ethereal solution is dried over anhydrous magnesium sulfate. The solvent is evaporated in vacuo to yield 12.6 grams of crude 3-amino-3-cyanotetrahydrothiophene. Recrystallization from ethanol yields pure amino nitrile, M.P. 60°–62° C.

When in the above procedure 2-methyl-3-ketotetrahydrothiophene, 2 - methyl - 4 - phenyl-3-ketotetrahydrothiophene, 4-methyl-5-phenyl-3-ketotetrahydrothiophene, and 5-methyl-3-ketotetrahydrothiophene are employed in place of 3-ketotetrahydrothiophene, there are obtained 3-amino- 3-cyano-2-methyltetrahydrothiophene, 3-amino-3-cyano-2-methyl-4-phenyltetrahydrothiophene, 3 - amino-3-cyano-4-methyl - 5 - phenyltetrahydrothiophene. Recrystallization from ethanol yields pure amino nitrile, M.P. 60°–62° C.

When in the above procedure 2-methyl-3-ketotetrahydrothiophene, 2 - methyl - 4 - phenyl-3-ketotetrahydrothiophene, 4-methyl-5-phenyl-3-ketotetrahydrothiophene, and 5-methyl-3-ketotetrahydrothiophene are employed in place of 3-ketotetrahydrothiophene, there are obtained 3-amino-3-cyano-2-methyltetrahydrothiophene, 3-amino-3-cyano-2-methyl-4-phenyltetrahydrothiophene, 3 - amino-3-cyano-4-methyl - 5 - phenyltetrahydrothiophene, and 3 - amino - 3 - cyano-5-methyltetrahydrothiophene, respectively.

EXAMPLE 6

3-aminotetrahydrothiophene-3-carboxylic acid 3-amino-3-cyanotetrahydrothiophene (10.5 grams, 0.08 mole) in 50 ml. of concentrated hydrochloric acid is heated at reflux temperature for 2½ hours. The reaction mixture is evaporated to dryness in vacuo, the residue is taken up in 50 ml. of water, and the solution is treated on the steam bath with activated carbon, filtered and neutralized by the addition of concentrated ammonium hydroxide. On cooling, a crystalline solid settles out of solution, the solid is filtered off, and upon recrystallization from aqueous ethanol, 3-aminotetrahydrothiophene-3-carboxylic acid, M.P. 270° C.–273° C. dec. is obtained.

When in the above procedure 3-amino-3-cyano-2-methyltetrahydrothiophene, 3-amino-3-cyano-2-methyl-4-phenyltetrahydrothiophene, 3-amino-3-cyano-4-methyl-5-phenyltetrahydrothiophene, and 3-amino-3-cyano-5-methyltetrahydrothiophene are employed in place of 3-amino-3-cyanotetrahydrothiophene, there are obtained 3-amino-2-methyltetrahydrothiophene-3-carboxylic acid, 3-amino-2-methyl - 4 - phenyltetrahydrothiophene - 3-carboxylic acid, 3 - amino - 4 - methyl-5-phenyltetrahydrothiophene-3-carboxylic acid, and 3-amino-5-methyltetrahydrothiophene-3-carboxylic acid, respectively.

It should be understood that although this invention has been described with reference to particular embodiments thereof, changes and modifications may be made which are within its intended scope, and it should be limited only by the language of the appended claims.

What is claimed is:

1. A compound of the formula

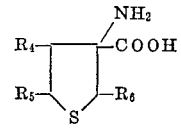

and acid and amine addition salts thereof, where $R_4$, $R_5$ and $R_6$ are selected from the group consisting of hydrogen, loweralkyl, and phenyl.

2. The compound of claim 1, which compound is 3-amino-tetrahydrothiophene-3-carboxylic acid.

References Cited

Zelinsky, et al.; Chem. Ber. 39; 1722–32 (1906).
Zelinsky, et al., Chem. Ber. 41; 2061–3 (1908).

HENRY R. JILES, Primary Examiner

C. M. SHURKO, Assistant Examiner